United States Patent
Cozzo et al.

(10) Patent No.: US 12,301,488 B2
(45) Date of Patent: May 13, 2025

(54) METHODS AND APPARATUS FOR RANDOM ACCESS PROCEDURES WITH SPATIAL SETTINGS

(71) Applicant: Samsung Electronics Co., Ltd., Suwon-si (KR)

(72) Inventors: Carmela Cozzo, San Diego, CA (US); Aristides Papasakellariou, Houston, TX (US); Emad N. Farag, Flanders, NJ (US)

(73) Assignee: Samsung Electronics Co., Ltd., Suwon-si (KR)

( * ) Notice: Subject to any disclaimer, the term of this patent is extended or adjusted under 35 U.S.C. 154(b) by 229 days.

(21) Appl. No.: 17/448,679

(22) Filed: Sep. 23, 2021

(65) Prior Publication Data
US 2022/0109540 A1    Apr. 7, 2022

Related U.S. Application Data

(60) Provisional application No. 63/086,952, filed on Oct. 2, 2020.

(51) Int. Cl.
*H04W 74/0833* (2024.01)
*H04B 17/318* (2015.01)
(Continued)

(52) U.S. Cl.
CPC ......... *H04L 5/0048* (2013.01); *H04B 17/318* (2015.01); *H04W 74/0833* (2013.01)

(58) Field of Classification Search
CPC ... H04L 5/0048; H04L 5/0091; H04B 17/318; H04W 74/0833
See application file for complete search history.

(56) References Cited

U.S. PATENT DOCUMENTS 11,228,948 B2 *   1/2022   Murray ............ H04W 36/0005
2019/0052334 A1   2/2019   Jeon et al.
(Continued)

FOREIGN PATENT DOCUMENTS

WO    2020197351 A1    10/2020

OTHER PUBLICATIONS

"3rd Generation Partnership Project; Technical Specification Group Radio Access Network; NR; Physical channels and modulation (Release 16)", 3GPP TS 38.211 V16.0.0, Dec. 2019, 129 pages.
(Continued)

*Primary Examiner* — Christopher M Crutchfield
*Assistant Examiner* — Aixa A Guadalupe Cruz

(57) ABSTRACT

Methods and apparatus for random access procedures with spatial settings. A method of operating a user equipment includes receiving a system information block (SIB). The SIB indicates a set of channel state information reference signals (CSI-RS) resources for CSI-RSs, a set of random access occasions (ROs), and a mapping between the set of ROs and the set of CSI-RS resources. The method further includes determining a first RO from the set of ROs for transmission of a first physical random access channel (PRACH), determining a first spatial setting for the first PRACH transmission based on a first CSI-RS resource from the set of CSI-RS resources that is mapped to the first RO, and transmitting the first PRACH in the first RO using the first spatial setting.

20 Claims, 11 Drawing Sheets

(51) Int. Cl.
    *H04L 5/00*          (2006.01)
    *H04W 74/00*       (2009.01)
    *H04W 74/0836*    (2024.01)

(56) References Cited

U.S. PATENT DOCUMENTS

| | | | |
|---|---|---|---|
| 2019/0141693 A1 | 5/2019 | Guo et al. | |
| 2020/0146068 A1* | 5/2020 | Islam | H04L 5/0048 |
| 2020/0267764 A1* | 8/2020 | Rastegardoost | H04W 72/0446 |
| 2020/0275492 A1 | 8/2020 | Lei et al. | |
| 2020/0281018 A1 | 9/2020 | Li et al. | |
| 2021/0068161 A1* | 3/2021 | Takahashi | H04L 5/0048 |
| 2023/0032007 A1* | 2/2023 | Ali | H04B 7/0695 |

OTHER PUBLICATIONS

"3rd Generation Partnership Project; Technical Specification Group Radio Access Network; NR; Multiplexing and channel coding (Release 16)", 3GPP TS 38.212 V16.0.0, Dec. 2019, 145 pages.
"3rd Generation Partnership Project; Technical Specification Group Radio Access Network; NR; Physical layer procedures for control (Release 16)", 3GPP TS 38.213 V16.0.0, Dec. 2019, 146 pages.
"3rd Generation Partnership Project; Technical Specification Group Radio Access Network; NR; Physical layer procedures for data (Release 16)", 3GPP TS 38.214 V16.0.0, Dec. 2019, 147 pages.
"5G; NR; Medium Access Control (MAC) protocol specification (3GPP TS 38.321 version 15.8.0 Release 15)", ETSI TS 138 321 V15.8.0, Jan. 2020, 80 pages.
"5G; NR; Radio Resource Control (RRC); Protocol specification (3GPP TS 38.331 version 15.8.0 Release 15)", ETSI TS 138 331 V15.8.0, Jan. 2020, 527 pages.
International Search Report and Written Opinion issued Jan. 14, 2022 regarding International Application No. PCT/KR2021/013443, 7 pages.
Samsung, "Corrections on two-step Rach", 3GPP TSG-RAN WG1 Meeting #101-e, R1-2005148, May 2020, 7 pages.
Extended European Search Report issued Nov. 20, 2023, regarding Application No. 21876055.1, 11 pages.
Nokia et al., "On 2-step RACH Procedure", 3GPP TSG RAN WG1 #96, R1-1902136, Feb. 2019, 10 pages.
Samsung et al., "Miscellaneous corrections", 3GPP TSG-RAN Meeting #89, RP-201932, Sep. 2020, 41 pages.

* cited by examiner

METHODS AND APPARATUS FOR RANDOM ACCESS PROCEDURES WITH SPATIAL SETTINGS

CROSS-REFERENCE TO RELATED APPLICATION AND CLAIM OF PRIORITY

This application claims priority under 35 U.S.C. § 119(e) to U.S. Provisional Patent Application No. 63/086,952 filed on Oct. 2, 2020. The above-identified provisional patent application is hereby incorporated by reference in its entirety.

TECHNICAL FIELD

The present disclosure relates generally to wireless communication systems and, more specifically, the present disclosure relates to methods and apparatus for random access procedures with spatial settings.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

This disclosure relates to methods and apparatus for random access procedures with spatial settings.

In one embodiment, a user equipment (UE) is provided. The UE includes a transceiver configured to receive a system information block (SIB). The SIB indicates a set of channel state information reference signals (CSI-RS) resources for CSI-RSs, a set of random access occasions (ROs), and a mapping between the set of ROs and the set of CSI-RS resources. The UE further includes a processor operably coupled to the transceiver. The processor is configured to determine a first RO from the set of ROs for transmission of a first physical random access channel (PRACH) and a first spatial setting for the first PRACH transmission based on a first CSI-RS resource from the set of CSI-RS resources that is mapped to the first RO. The transceiver is further configured to transmit the first PRACH in the first RO using the first spatial setting.

In another embodiment, a base station (BS) is provided. The BS includes a transceiver configured to transmit a SIB. The SIB indicates a set of CSI-RS resources for CSI-RSs, a set of ROs, and a mapping between a set of ROs and the set of CSI-RS resources. The BS further includes a processor operably coupled to the transceiver, the processor configured to determine a first RO from the set of ROs for reception of a first PRACH and a first spatial setting for the first PRACH reception based on a first CSI-RS resource from the set of CSI-RS resources that is mapped to the first RO. The transceiver is further configured to receive the first PRACH in the first RO using the first spatial setting.

In yet another embodiment, a method is provided. The method includes receiving a SIB. The SIB indicates a set of CSI-RS resources for CSI-RSs, a set of ROs, and a mapping between a set of ROs and the set of CSI-RS resources. The method further includes determining a first RO from the set of ROs for transmission of a first PRACH, determining a first spatial setting for the first PRACH transmission based on a first CSI-RS resource from the set of CSI-RS resources that is mapped to the first RO, and transmitting the first PRACH in the first RO using the first spatial setting.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
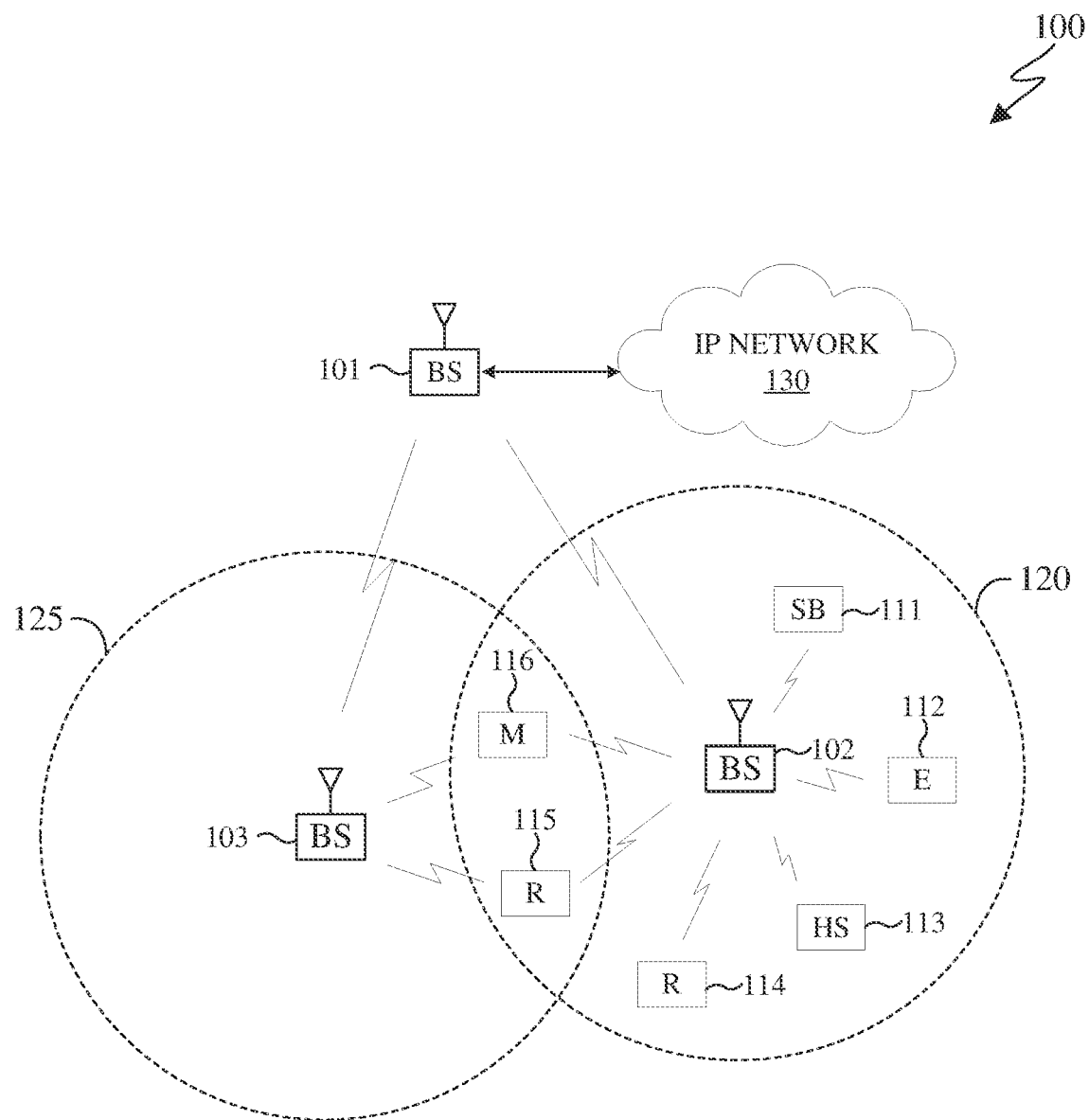
FIG. 1 illustrates an example wireless network according to embodiments of the present disclosure.

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

The following documents are hereby incorporated by reference into the present disclosure as if fully set forth herein: (i) 3GPP TS 38.211 v16.0.0, "NR; Physical channels and modulation;" (ii) 3GPP TS 38.212 v16.0.0, "NR; Multiplexing and channel coding;" (iii) 3GPP TS 38.213 v16.0.0, "NR; Physical layer procedures for control;" (iv) 3GPP TS 38.214 v16.0.0, "NR; Physical layer procedures for data;" (v) 3GPP TS 38.321 v15.8.0, "NR; Medium Access Control (MAC) Protocol Specification;" and (vi) 3GPP TS 38.331 v15.8.0, "NR; Radio Resource Control (RRC) Protocol Specification."

To meet the demand for wireless data traffic having increased since deployment of the fourth generation (4G) communication systems, efforts have been made to develop and deploy an improved 5th generation (5G) or pre-5G/NR communication system. Therefore, the 5G or pre-5G communication system is also called a "beyond 4G network" or a "post long term evolution (LTE) system."

The 5G communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, coordinated multi-points (CoMP), reception-end interference cancellation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Depending on the network type, the term 'base station' (BS) can refer to any component (or collection of components) configured to provide wireless access to a network, such as transmit point (TP), transmit-receive point (TRP), an enhanced base station (eNodeB or eNB), a gNB, a macrocell, a femtocell, a WiFi access point (AP), a satellite, or other wirelessly enabled devices. Base stations may provide wireless access in accordance with one or more wireless communication protocols, e.g., 5G 3GPP New Radio Interface/Access (NR), LTE, LTE advanced (LTE-A), High Speed Packet Access (HSPA), Wi-Fi 802.11a/b/g/n/ac, etc. The terms 'BS,' 'gNB,' and 'TRP' can be used interchangeably in this disclosure to refer to network infrastructure components that provide wireless access to remote terminals. Also, depending on the network type, the term 'user equipment' (UE) can refer to any component such as mobile station, subscriber station, remote terminal, wireless terminal, receive point, vehicle, or user device. For example, a UE could be a mobile telephone, a smartphone, a monitoring device, an alarm device, a fleet management device, an asset tracking device, an automobile, a desktop computer, an entertainment device, an infotainment device, a vending machine, an electricity meter, a water meter, a gas meter, a security device, a sensor device, an appliance, and the like.

Figure 2:
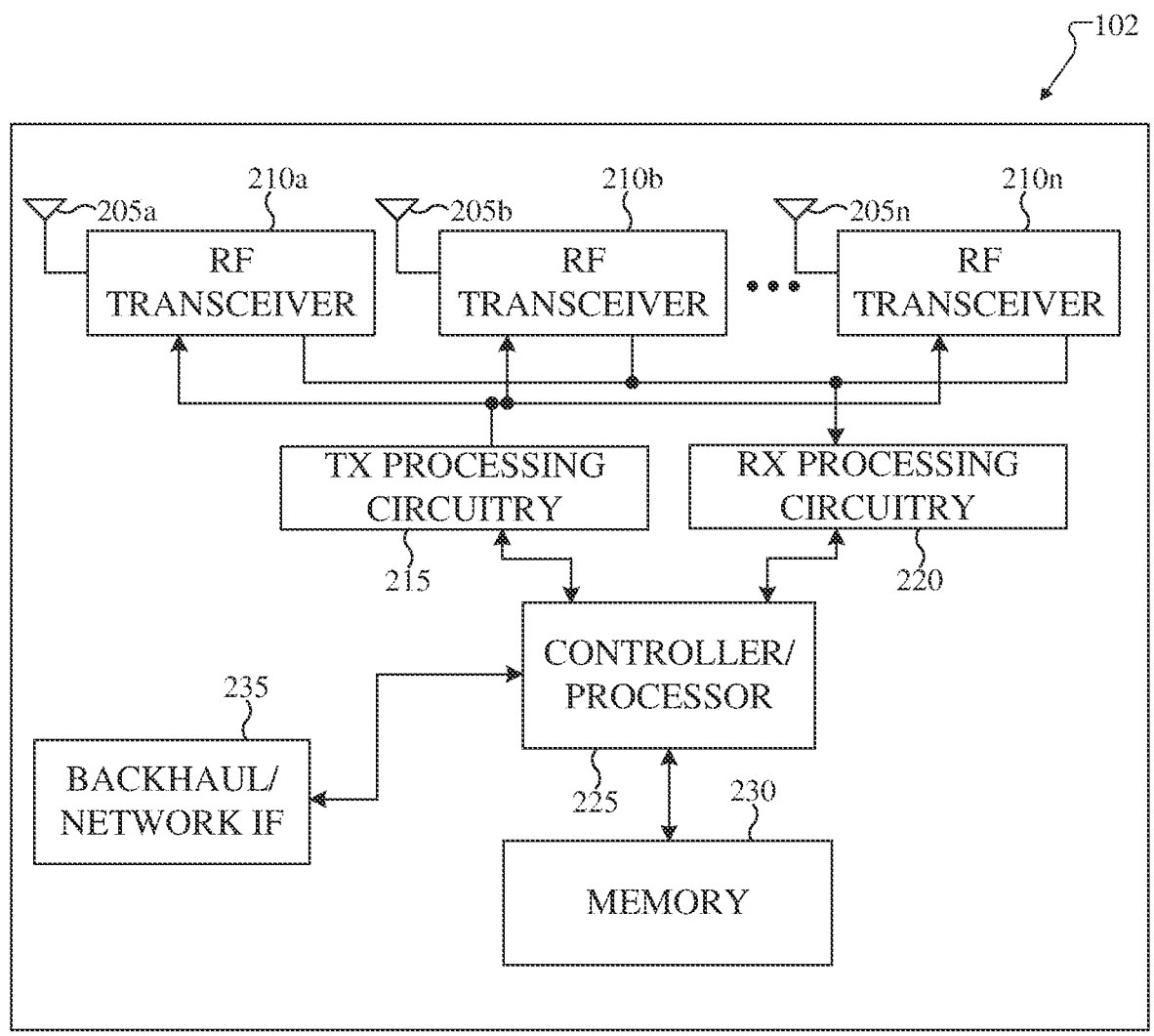
FIG. 2 illustrates an example BS according to embodiments of the present disclosure.
Figure 3:
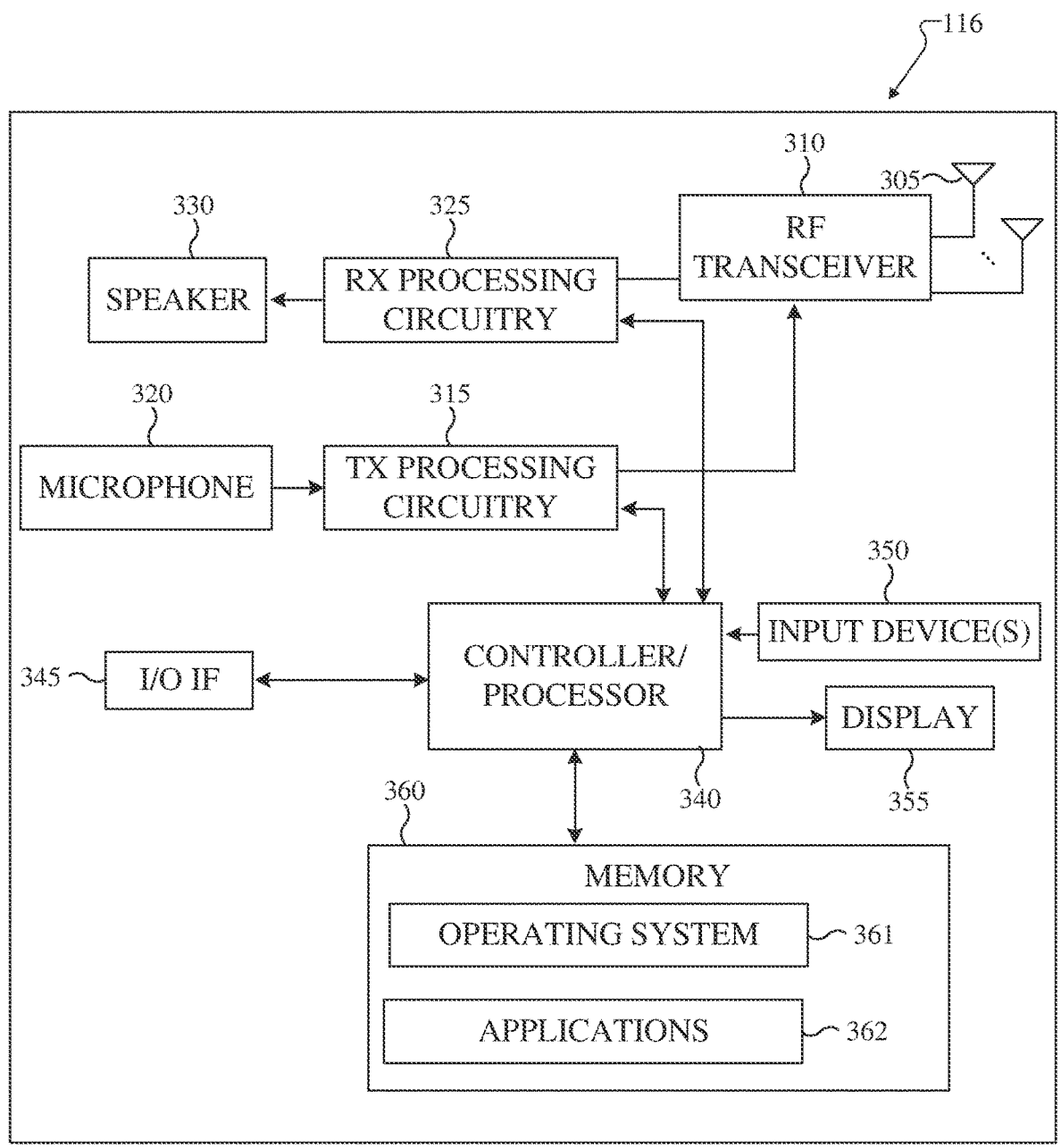
FIG. 3 illustrates an example UE according to embodiments of the present disclosure.

FIGS. 1-3 below describe various embodiments implemented in wireless communications systems and with the use of orthogonal frequency division multiplexing (OFDM)

or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network 100 according to embodiments of the present disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes a base station, BS 101 (e.g., gNB), a BS 102, and a BS 103. The BS 101 communicates with the BS 102 and the BS 103. The BS 101 also communicates with at least one network 130, such as the Internet, a proprietary Internet Protocol (IP) network, or other data network.

The BS 102 provides wireless broadband access to the network 130 for a first plurality of user equipment's (UEs) within a coverage area 120 of the BS 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The BS 103 provides wireless broadband access to the network 130 for a second plurality of UEs within a coverage area 125 of the BS 103. The second plurality of UEs includes the UE 115 and the UE 116. In some embodiments, one or more of the BSs 101-103 may communicate with each other and with the UEs 111-116 using 5G/NR, long term evolution (LTE), long term evolution-advanced (LTE-A), WiMAX, WiFi, or other wireless communication techniques.

Dotted lines show the approximate extents of the coverage areas 120 and 125, which are shown as approximately circular for the purposes of illustration and explanation only. It should be clearly understood that the coverage areas associated with BSs, such as the coverage areas 120 and 125, may have other shapes, including irregular shapes, depending upon the configuration of the BSs and variations in the radio environment associated with natural and man-made obstructions.

As described in more detail below, one or more of the UEs 111-116 include circuitry, programing, or a combination thereof for preforming random access procedures using spatial settings. In certain embodiments, and one or more of the BSs 101-103 includes circuitry, programing, or a combination thereof for random access procedures with spatial settings.

Although FIG. 1 illustrates one example of a wireless network, various changes may be made to FIG. 1. For example, the wireless network could include any number of BSs and any number of UEs in any suitable arrangement. Also, the BS 101 could communicate directly with any number of UEs and provide those UEs with wireless broadband access to the network 130. Similarly, each BS 102-103 could communicate directly with the network 130 and provide UEs with direct wireless broadband access to the network 130. Further, the BSs 101, 102, and/or 103 could provide access to other or additional external networks, such as external telephone networks or other types of data networks.

FIG. 2 illustrates an example BS 102 according to embodiments of the present disclosure. The embodiment of the BS 102 illustrated in FIG. 2 is for illustration only, and the BSs 101 and 103 of FIG. 1 could have the same or similar configuration. However, BSs come in a wide variety of configurations, and FIG. 2 does not limit the scope of this disclosure to any particular implementation of a BS.

As shown in FIG. 2, the BS 102 includes multiple antennas 205a-205n, multiple radio frequency (RF) transceivers 210a-210n, transmit (TX) processing circuitry 215, and receive (RX) processing circuitry 220. The BS 102 also includes a controller/processor 225, a memory 230, and a backhaul or network interface 235.

The RF transceivers 210a-210n receive, from the antennas 205a-205n, incoming RF signals, such as signals transmitted by UEs in the wireless network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the BS 102. For example, the controller/processor 225 could control the reception of uplink channel signals and the transmission of downlink channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support random access procedures with spatial settings Any of a wide variety of other functions could be supported in the BS 102 by the controller/processor 225. In some embodiments, the controller/processor 225 includes at least one microprocessor or microcontroller.

The controller/processor 225 is also capable of executing programs and other processes resident in the memory 230, such as an OS. The controller/processor 225 can move data into or out of the memory 230 as required by an executing process. In certain embodiments, the controller/processor 225 supports random access procedures with spatial settings. For example, the controller/processor 225 can move data into or out of the memory 230 according to a process that is being executed.

The controller/processor 225 is also coupled to the backhaul or network interface 235. The backhaul or network interface 235 allows the BS 102 to communicate with other devices or systems over a backhaul connection or over a network. The network interface 235 could support communications over any suitable wired or wireless connection(s). For example, when the BS 102 is implemented as part of a cellular communication system (such as one supporting 5G/NR, LTE, or LTE-A), the network interface 235 could allow the BS 102 to communicate with other BSs over a wired or wireless backhaul connection. When the BS 102 is implemented as an access point, the network interface 235 could allow the BS 102 to communicate over a wired or wireless local area network or over a wired or wireless connection to a larger network (such as the Internet). The network interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

As described in more detail below, the transmit and receive paths of the gNB 102 (implemented using the RF transceivers 372a-372n, TX processing circuitry 374, and/or RX processing circuitry 376) support communication with aggregation of frequency division duplexing (FDD) cells and time division duplexing (TDD) cells.

Although FIG. 2 illustrates one example of BS 102, various changes may be made to FIG. 2. For example, the BS 102 could include any number of each component shown in FIG. 2. As a particular example, an access point could include a number of network interfaces 235, and the controller/processor 225 could support routing functions to route data between different network addresses. As another particular example, while shown as including a single instance of TX processing circuitry 215 and a single instance of RX processing circuitry 220, the BS 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a RF transceiver 310, TX processing circuitry 315, a microphone 320, and receive (RX) processing circuitry 325. The UE 116 also includes a speaker 330, a processor 340, an input/output (I/O) interface (IF) 345, an input device 350, a display 355, and a memory 360. The memory 360 includes an operating system (OS) 361 and one or more applications 362.

The RF transceiver 310 receives, from the antenna 305, an incoming RF signal transmitted by a BS of the wireless network 100. The RF transceiver 310 down-converts the incoming RF signal to generate an intermediate frequency (IF) or baseband signal. The IF or baseband signal is sent to the RX processing circuitry 325 that generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of downlink channel signals and the transmission of uplink channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from BSs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input device 350. The operator of the UE 116 can use the input device 350 to enter data into the UE 116. The input device 350 can be a keyboard, touchscreen, mouse, track ball, voice input, or other device capable of acting as a user interface to allow a user in interact with the UE 116. For example, the input device 350 can include voice recognition processing, thereby allowing a user to input a voice command. In another example, the input device 350 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme.

The processor 340 is also coupled to the display 355. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4:
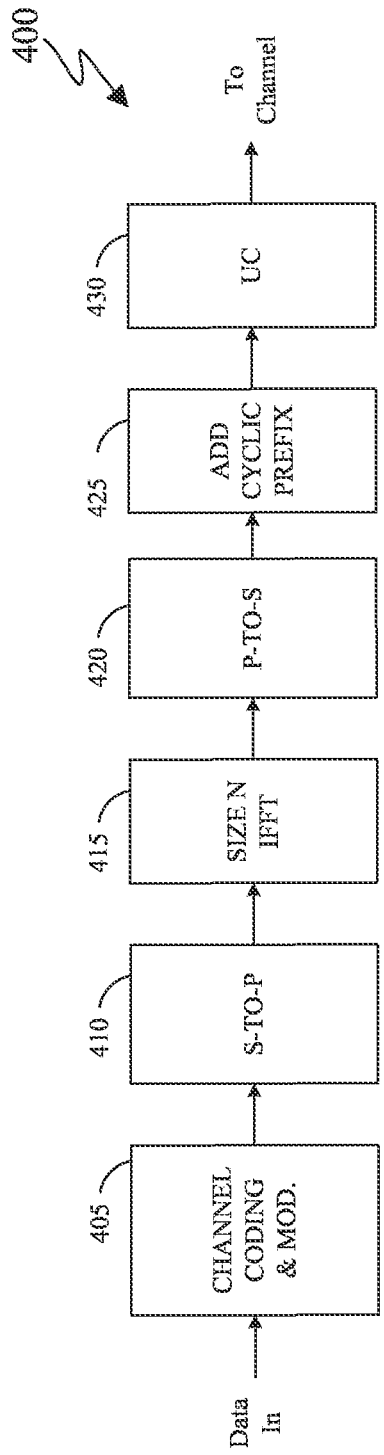
FIGS. 4 and 5 illustrate example wireless transmit and receive paths according to embodiments of present disclosure.
Figure 5:
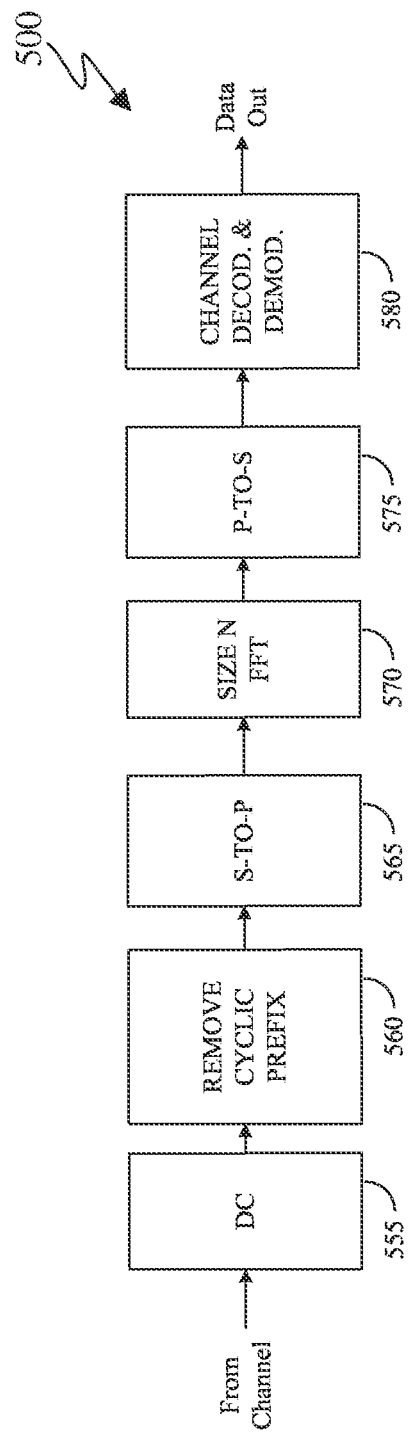

FIG. 4 and FIG. 5 illustrate example wireless transmit and receive paths according to this disclosure. In the following description, a transmit path 400, of FIG. 4, may be described as being implemented in a BS (such as the BS 102), while a receive path 500, of FIG. 5, may be described as being implemented in a UE (such as a UE 116). However, it may be understood that the receive path 500 can be implemented in a BS and that the transmit path 400 can be implemented in a UE. In some embodiments, the receive path 500 is configured to support random access procedures with spatial settings as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols. The serial-to-parallel block 410 converts (such as de-multiplexes) the serial modulated symbols to parallel data in order to generate N parallel symbol streams, where N is the IFFT/FFT size used in the BS 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the BS 102 arrives at the UE 116 after passing through the wireless channel, and reverse operations to those at the BS 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the BSs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the BSs 101-103 and may implement the receive path 500 for receiving in the downlink from the BSs 101-103.

Each of the components in FIG. 4 and FIG. 5 can be implemented using hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

In certain embodiments, a random access (RA) procedure is initiated by radio resource control (RRC) for a system information (SI) request if a system information block 1 (SIB1) includes scheduling information for an on-demand SI request, by a medium access control (MAC), or by a Physical Downlink Control Channel (PDCCH) order. The RA procedure can be initiated due to a variety of triggers or purposes. For example, a RA procedure can be initiated by a user equipment (UE) for initial access to establish an RRC connection, in other words to go from RRC_IDLE to RRC_CONNECTED, to re-establish an RRC connection after radio link failure (RLF), for an on-demand SI request, or for hand-over. In addition, the RA procedure can be initiated for uplink (UL) synchronization, a scheduling request (SR), positioning, or link recovery, referred to herein as beam failure recovery (BFR). A RA procedure can also be initiated from a serving base station (gNB) by a PDCCH order.

RA can operate in at least two modes. A first mode is contention-based random access (CBRA). In CBRA, UEs within a serving cell can share same RA resources and, accordingly, there is a possibility of collision among RA attempts from different UEs. A second mode is contention-free random access (CFRA). In CFRA, a UE has dedicated RA resources that are indicated by a serving gNB and may not be shared with other UEs so that RA collisions can be avoided.

A 4-step RA procedure, also known as a Type-1 (L1) random access procedure, includes (i) the transmission of a physical random access channel (PRACH) preamble (Msg1) by a UE, (ii) an attempt by the UE to receive a random access response (RAR or Msg2), (iii) the transmission of a contention resolution message (Msg3) physical uplink shared channel (PUSCH) by the UE, and (iv) the attempt by the UE to receive a contention resolution message (Msg4). An alternative RA procedure can include only two steps, referred to herein as 2-step RA or a Type-2 L1 random access procedure. In two step RA, Msg1 and Msg3 are combined into a MsgA transmission and Msg2 and Msg4 are combined into a MsgB reception. MsgA combines a PRACH preamble transmission in a random access channel (RACH) occasion (RO) along with a PUSCH transmission in a so-called PUSCH occasion (PO). The present disclosure considers both the 4-step RACH procedure and the 2-step RA procedure.

Embodiments of the present disclosure relate to a RA procedure for a UE (such as the UE 116) to establish radio resource control (RRC) connection with a serving gNB. Here, the random access procedure can include a transmission of a Msg1 PRACH, or of a MsgA PRACH and of a MsgA PUSCH by the UE, a RAR reception by the UE in response to the PRACH transmission and, for a contention based random access, a Msg3 PUSCH transmission by the UE for contention resolution.

Embodiments of the present disclosure also relate to determining a spatial setting for transmission of a Msg1 PRACH preamble, or of a MsgA PRACH preamble and MsgA PUSCH by the UE to a serving gNB.

Embodiments of the present disclosure further relate to determining by the UE (such as the UE 116) a spatial setting for transmission of an uplink channel.

Additionally, embodiments of the present disclosure relate a UE (such as the UE 116) selecting a RAR from multiple RARs to determine a subsequent uplink transmission.

Additionally, embodiments of the present disclosure also relate to including in a MsgA information about transmissions of PRACH preambles.

During initial cell search, a UE (such as the UE 116) acquires/detects a synchronization signal/physical broadcast channel (SS/PBCH) block transmitted by a gNB (such as the BS 102). The gNB can transmit multiple SS/PBCH blocks with different quasi-collocation properties (beams). The UE typically acquires a SS/PBCH block corresponding to a largest signal to interference and noise ratio (SINR) or a largest reference signal received power (RSRP) for the synchronization signal. In case of reciprocal reception/transmission quasi-collocation properties at the UE, the SS/PBCH block that the UE detects has quasi-collocation properties that best match the ones of transmissions from the UE. Then, the UE can transmit PRACH according to the spatial setting that is determined from the detected SS/PBCH block.

A gNB (such as the BS 102) transmits a SS/PBCH block with a relatively "wide" beam in order to cover a corresponding wide area on a cell. Typically, there is a coverage imbalance between downlink (DL) receptions and uplink (UL) transmissions due to imbalance in maximum powers than can be used for respective transmissions by a gNB and by a UE. To compensate for such coverage imbalance, a UE configured with a 4-step RA can transmit a PRACH with a narrow beam or perform sweeping over multiple narrow beams in order to cover a larger spatial area. For CFRA, a UE is assigned a dedicated preamble for PRACH transmission is assigned by the gNB and upon receiving RAR from the gNB, the UE ends the random access procedure. For CBRA, upon reception of the RAR, the UE transmits Msg3 PUSCH based on the UL grant included in the RAR and monitors PDCCH for scheduling a Msg4 PDSCH providing contention resolution. When the UE receives a RAR, the UE transmits a Msg3. When the Msg3 is not correctly received by the gNB, the UE may have transmitted Msg3 using a spatial filter that does not provide sufficiently large SINR at the gNB. The gNB can schedule a Msg3 retransmission from the UE, but the Msg3 retransmission from the UE would typically need to be with a spatial filter that provides sufficiently large SINR in order to be correctly received by the gNB.

When a UE is configured with a 2-step RA, similar to the 4-step RA procedure, a UE can transmit a MsgA with a narrow beam or perform sweeping over multiple narrow beams. For CFRA, dedicated PRACH preamble and PUSCH resource are configured for MsgA transmission and upon receiving the RAR, the UE ends the random access procedure. For CBRA, if contention resolution is successful upon receiving the RAR, the UE ends the random access procedure, while if fallback indication is received in MsgB (when the gNB receives the PRACH and does not receive the PUSCH of MsgA), the UE performs Msg3 transmission using the UL grant included in the fallback indication in MsgB and monitors contention resolution.

A gNB can configure a UE to perform both a 4-step RA and 2-step RA, and the UE can perform sweeping over multiple narrow beams and transmit either a Msg1 or a MsgA in each narrow beam in order to enhance detection of a PRACH preamble by a gNB and a robustness of the random access procedure. For example, when channel conditions in a certain beam of a certain width are more favorable, such as when a reception of a reference signal from a certain beam has larger reference signal received power (RSRP) than from other beams, or a RSRP is larger than a threshold that can be indicated in a system information block (SIB), a UE can initiate a random access procedure with a 2-step RA by transmitting MsgA based on such beam. The use of a 2-step RA procedure is beneficial to reduce latency and control signaling overhead due to a single round trip cycle between the UE and the gNB. The gNB may be able to detect one or more of the UE transmissions, and transmit one or more RAR.

Accordingly, embodiments of the present disclosure take into consideration that there is a need to enable a UE to determine a spatial setting for either a MsgA or a Msg1 transmission for a random access procedure.

Embodiments of the present disclosure also take into consideration that there is a need to enable a UE to perform both a 2-step RA procedure and a 4-step RA procedure.

Embodiments of the present disclosure further take into consideration that there is a need to provide means for a UE to determine an uplink transmission upon reception of multiple RARs.

Embodiments of the present disclosure describe a determination of a spatial filter for transmission of either a MsgA or a Msg1 to a serving gNB by a UE. The following examples and embodiments, such as those of FIG. 6, describe a UE determining spatial filter for transmission of either a MsgA or a Msg1 to a serving gNB.

Figure 6:
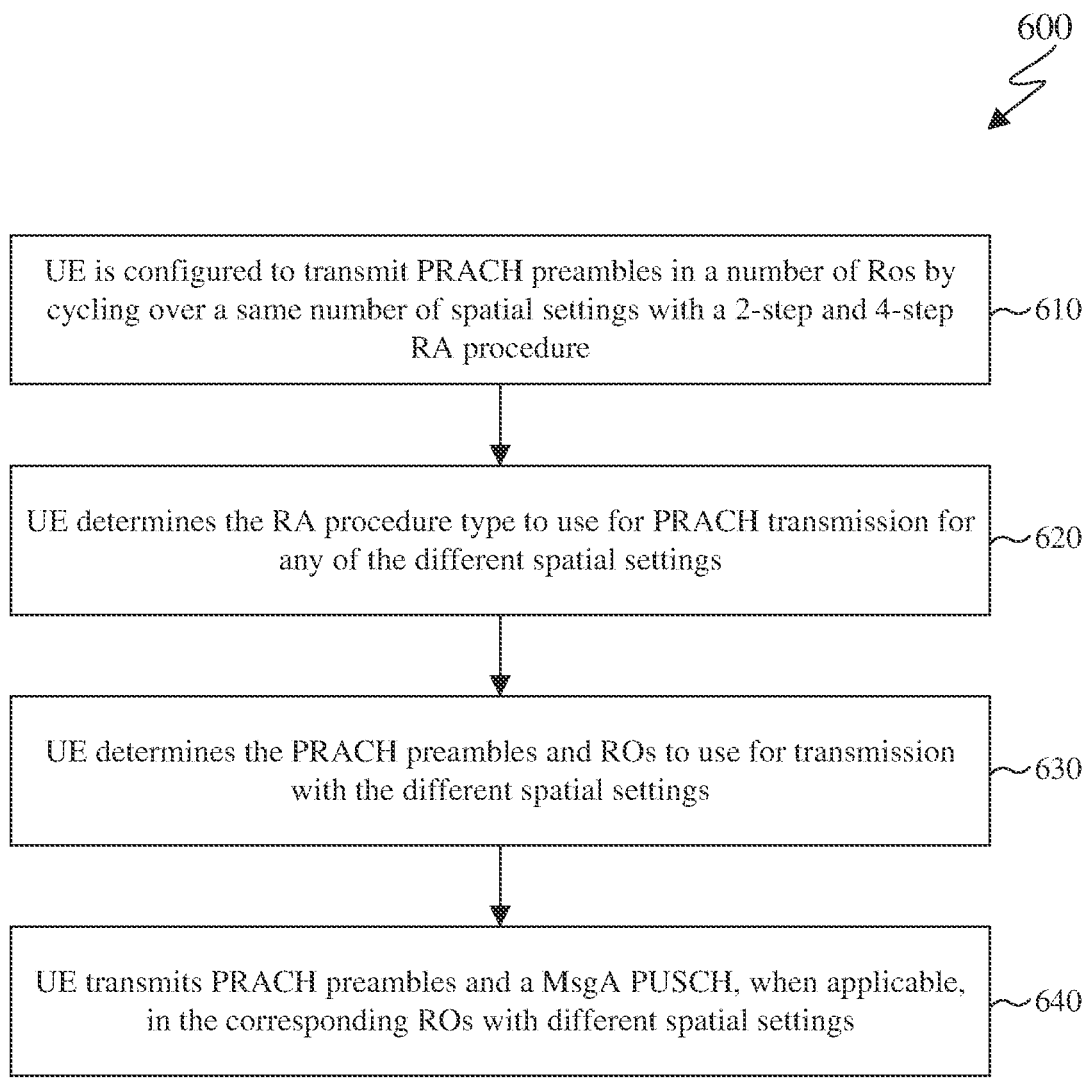
FIG. 6 illustrates an example method for a UE to transmit PRACH preambles and a PUSCH, if applicable, using a 2-step random access (RA) procedure and a 4-step RA procedure, with different spatial settings according to embodiments of present disclosure.

FIG. 6 illustrates an example method 600 for a UE to transmit PRACH preambles and a PUSCH, if applicable, using a 2-step RA procedure and a 4-step RA procedure, with different spatial settings according to embodiments of present disclosure. The steps of the method 600 can be performed by any of the UEs 111-116 of FIG. 1, such as the UE 116 of FIG. 3 and a complementary procedure may be performed by a BS, such as BS 102. The method 600 of FIG. 6 is for illustration only and other embodiments can be used without departing from the scope of the present disclosure.

To enhance the robustness of a RA procedure when a UE performs sweeping over multiple beams, a UE can use a 2-step RA procedure when transmitting with certain spatial settings and use a 4-step RA procedure when transmitting with other spatial settings. A gNB can configure a UE with two types for a RA procedure, namely 2-step RA and 4-step RA, and then the UE selects a type of random access at initiation of the RA procedure.

It is noted that the PRACH preambles configured for a 2-step RA procedure are separate from the PRACH preambles configured for a 4-step RA procedure. For example, contention based PRACH preambles per SS/PBCH block per valid PRACH occasion for 2-step RA procedure start after the ones for 4-step RA procedure. The ROs for a 2-step RA procedure can be common or can be separate from ROs for 4-step RA procedure. When the UE can use either a 2-step RA procedure or a 4-step RA procedure to transmit PRACH preambles with different spatial settings, the ROs for the 2-step RA procedure can be separated from the ROs for the 4-step RA procedure.

For example, a UE (such as the UE 116) can transmit $N_1^{preamble}$ different PRACH preambles selected from a partition of PRACH preambles for 2-step RA procedure in $N_1$ ROs using a same number of spatial settings when using a 2-step RA procedure, and can transmit $N_2^{preamble}$ different PRACH preambles selected from another partition of PRACH preamble for 4-step RA procedure in $N_2$ ROs using a same number of spatial settings when using a 4-step RA procedure. Here, the ROs for 4-step RA can be same as or different from the ROs for 2-step RA. A mapping of ROs to spatial settings can be provided by a SIB, such as a SIB1.

For another example, a UE (such as the UE 116) can also transmit a same PRACH preamble repeated a number of times over different ROs by cycling over different spatial settings wherein the number of PRACH repetitions can be different for the 2-step RA procedure and the 4-step RA procedure. For instance, for 2-step RA starting from a first $RO_1^{2\text{-}step}$, the UE transmits a same PRACH preamble in ROs with time index mod N for N repetitions with cycling of a spatial setting wherein mod( ) is the modulo function, and for 4-step RA starting from a first $RO_1^{4\text{-}step}$ the UE transmits a same PRACH preamble in ROs with time index mod M for M repetitions with cycling of a spatial setting, wherein N and M can be same or different. In another instance, the UE transmits $N_p$ PRACH preambles using N ROs, wherein first $\lceil N_p/N \rceil \cdot (N_p - \lfloor N_p/N \rfloor \cdot N)$ PRACH preambles are transmitted in corresponding first $N_p - \lfloor N_p/N \rfloor \cdot N$ ROs from the N ROs and last $N_p - \lceil N_p/N \rceil \cdot (N_p - \lfloor N_p/N \rfloor \cdot N)$ PRACH preambles are transmitted in corresponding last $N - N_p + \lfloor N_p/N \rfloor \cdot N$ ROs. A same PRACH preamble can also be used for each spatial setting to enable combining at a gNB. This mapping can apply to the PRACH preambles and ROs (and corresponding POs, if applicable) of either the 4-step RA procedure or the 2-step RA procedure, or both.

For yet another example, when a UE (such as the UE 116) transmits in a total of N ROs using the 2-step RA procedure for transmitting in M ROs and corresponding M POs with M spatial settings, and using the 4-step RA procedure for transmitting in (N−M) ROs with (N−M) spatial settings, the mapping of PRACH preambles to ROs for the 2-step RA procedure or the 4-step RA procedure can be a 1-to-1 mapping or a 1-to-many mapping, and can be different for the two RA procedures.

In certain embodiments, a gNB configures a UE with a 2-step RA procedure and with a 4-step RA procedure. Here the set of PRACH preambles and the set of ROs associated with a RA procedure type are separate sets. The gNB can also configure the UE to transmit PRACH preambles in a set of ROs using different spatial settings. In a first example, the UE transmits 4 PRACH preambles with 4 different spatial settings, and uses the 2-step RA procedure for transmitting with a first spatial setting and the 4-step RA procedure for transmitting with a second, a third and a fourth spatial settings. For a 2-step RA procedure, a UE can transmit a MsgA PUSCH after a PRACH transmission by at least S symbols where S depends on the SCS configuration for the active UL BWP. If the UE would use only a 2-step RA procedure, the UE would transmit PRACH preambles $P_1^{2\text{-}step}, P_2^{2\text{-}step}, P_3^{2\text{-}step}, P_4^{2\text{-}step}$ and a MsgA PUSCH, in the corresponding $RO_1^{2\text{-}step}, RO_2^{2\text{-}step}, RO_3^{2\text{-}step}, RO_4^{2\text{-}step}$ and $PO_1^{2\text{-}step}, PO_2^{2\text{-}step}, PO_3^{2\text{-}step}, PO_4^{2\text{-}step}$ with the different spatial settings. Here, transmission of a PRACH preamble in $RO_i^{2\text{-}step}$ and a MsgA PUSCH in $PO_i^{2\text{-}step}$, i=1, . . . , 4 use a same spatial setting. If the UE would use only a 4-step RA procedure, the UE would transmit PRACH preambles $P_1^{4\text{-}step}, P_2^{4\text{-}step}, P_3^{4\text{-}step}, P_4^{4\text{-}step}$ in the corresponding $RO_1^{4\text{-}step}, RO_2^{4\text{-}step}, RO_3^{4\text{-}step}, RO_4^{4\text{-}step}$ with the different spatial settings.

When using both types of RA procedures as in the above example, the UE transmits a PRACH preamble $P_1^{2\text{-}step}$ and a MsgA PUSCH in corresponding $RO_1^{2\text{-}step}$ and $PO_1^{2\text{-}step}$ with a first spatial setting, a PRACH preamble $P_2^{4\text{-}step}$ in a corresponding $RO_2^{4\text{-}step}$ with a second spatial setting, a PRACH preamble $PO_2^{4\text{-}step}$ in a corresponding $RO_2^{4\text{-}step}$ with a third spatial setting, and a PRACH preamble $P_3^{4\text{-}step}$ in a corresponding $RO_3^{4\text{-}step}$ with a fourth spatial setting. In general, when a UE transmits PRACH preambles with N different spatial settings, the UE can use the 2-step RA procedure for transmitting in M ROs and corresponding M POs with M spatial settings, and use the 4-step RA procedure for transmitting in (N−M) ROs with (N−M) spatial settings.

As shown in FIG. 6, a UE (such as the UE 116) transmit PRACH preambles in a number of ROs by cycling over a same number of spatial settings with a 2-step and 4-step RA procedure (step 610). In step 620, the UE determines the RA procedure type to use for PRACH transmission for any of the different spatial settings. In step 630, the UE determines the PRACH preambles and ROs to use for transmission with the different spatial settings. In step 640, the UE transmits PRACH preambles and a MsgA PUSCH, when applicable, in the corresponding ROs with different spatial settings.

Although FIG. 6 illustrate the method 600 various changes may be made to FIG. 6. For example, while the method 600 of FIG. 6 is shown as a series of steps, various steps could overlap, occur in parallel, occur in a different order, or occur multiple times. In another example, steps may be omitted or replaced by other steps. For example, steps of the method 600 can be executed in a different order.

Embodiments of the present disclosure also describe a UE determining whether to initiate a 2-step or a 4-step RA procedure. The following examples and embodiments, describe a UE determining whether to initiate a 2-step or a 4-step RA procedure.

When a UE (such as the UE 116) is configured 2-step and 4-step RA procedures, the UE can determine which procedure to use based on measurements of a DL channel quality. A gNB (such as the BS 102) can configure CSI-RS in SIB and enable the UE to perform measurements to determine whether to initiate a 2-step RA procedure or a 4-step RACH procedure. A UE can also perform measurements based on the received SSB in order to determine whether to initiate a 2-step RA procedure or a 4-step RACH procedure.

Embodiments of the present disclosure further describe configuring RO indices in SIB for 2-step and 4-step RA. The following examples and embodiments, such as those of FIG. 7, describe configuring RO indices in SIB for 2-step and 4-step RA.

Figure 7:
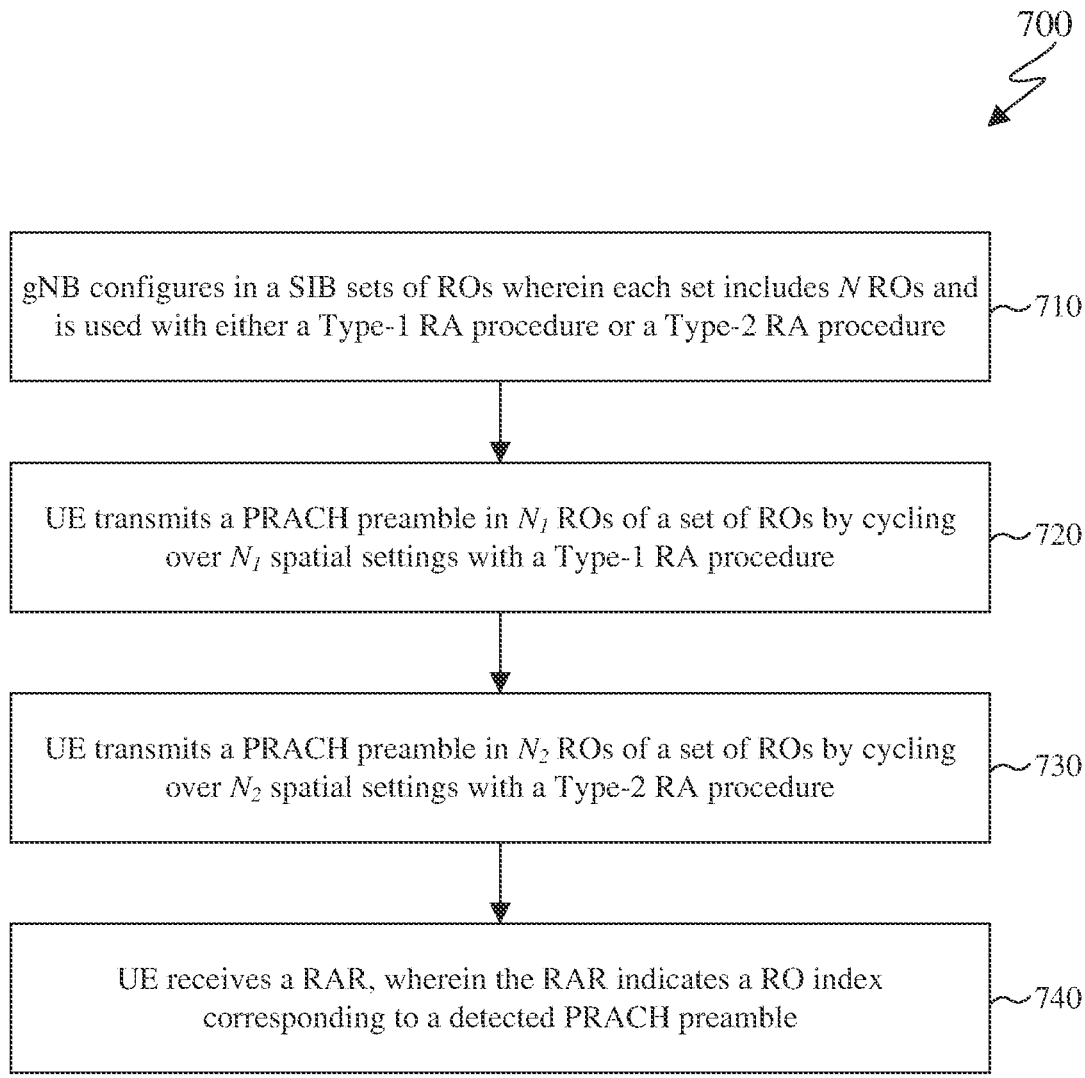
FIG. 7 illustrates an example method for a UE to transmit PRACH preambles in a set of ROs configured in a SIB based on a 2-step RA procedure and based on a 4-step RA procedure according to embodiments of present disclosure.

FIG. 7 illustrates an example method 700 for a UE to transmit PRACH preambles in a set of ROs configured in a SIB based on a 2-step RA procedure and based on a 4-step RA procedure according to embodiments of present disclosure. The steps of the method 700 can be performed by any of the UEs 111-116 of FIG. 1, such as the UE 116 of FIG. 3, and/or any of the BSs 101-103 of FIG. 1, such as the BS 102 of FIG. 2. The method 700 of FIG. 7 is for illustration only and other embodiments can be used without departing from the scope of the present disclosure.

In certain embodiments, a gNB (such as the BS 102) configures in a SIB RO indices that can be used by UEs to transmit PRACH in sets of N Ros. Here, each set of ROs are configured to be used with either a 2-step RA procedure or a 4-step RA procedure. It is also possible that one set of ROs can be used with a 2-step RA procedure and a 4-step RA procedure. When a UE (such as the UE 116) selects a set of N ROs and is configured with either a 2-step RA procedure or a 4-step RA procedure, the UE transmits PRACH preambles in the N ROs before the UE receives a RAR. When a UE is configured with both 2-step and 4-step RA procedures, the UE is configured with at least two sets of ROs, wherein the indices within one set and across sets may have sequential or non-sequential indices, and the UE can select a set of ROs for transmission with a 2-step RA procedure and another set of ROs for transmission with a 4-step RA procedure. Different sets of ROs can have a same or different number of ROs. The UE can transmit N PRACH preambles in the N ROs selected from the multiple sets configured for the RA procedure types, cycling over N spatial settings. Alternatively, the UE can transmit a same first PRACH preamble in the ROs for a 2-step RA procedure cycling over different spatial settings, and a same second PRACH preamble in the ROs for a 4-step RA procedure cycling over different spatial settings. It is also possible that a UE can be configured to use multiple sets of ROs for use with one RA procedure, wherein the RO indices in two sets of ROs may have sequential or non-sequential indices. When a gNB configures a UE for PRACH transmission in multiple sets of ROs, the UE would transmit the PRACH preambles in all ROs in the S sets of ROs before the UE receives a RAR.

A gNB (such as the BS 102) can indicate in a SIB, or it can be predetermined in a system operation, that a UE transmits a same PRACH preamble in the multiple ROs for a RA type procedure. For example, when a UE (such as the UE 116) selects a set of $N_1$ ROs from the partition of ROs for transmission with Type-1 RA procedure and selects a set of $N_2$ ROs from the partition of ROs for transmission with Type-2 RA procedure, the UE transmits a first same PRACH preamble cycling over $N_1$ spatial settings in the $N_1$ ROs and transmits a second same PRACH preamble cycling over $N_2$ spatial settings in the $N_2$ ROs. The spatial settings can be determined based on receptions for corresponding CSI-RS configurations provided in SIB.

A gNB (such as the BS 102) can also configure in a SIB a partition of ROs, wherein ROs in a set of N ROs can be used by a UE to transmit multiple PRACH preambles while other ROs can be used by a UE to transmit a single PRACH preamble. Such configuration can be done independently for the ROs used for a RA procedure type.

A gNB (such as the BS 102) can further configure in a SIB a partition of PRACH preambles that a UE can use for transmission in a set of ROs by cycling over different spatial settings and PRACH preambles that a UE can use for transmission in a single RO before the UE receives a corresponding RAR. Such configuration is done independently for the ROs used for a RA type procedure.

As shown in FIG. 7, a gNB configures in a SIB sets of ROs wherein each set includes N ROs and is used with either a Type-1 RA procedure or a Type-2 RA procedure (step 710). In step 720, the UE transmits a PRACH preamble in $N_1$ ROs of a set of ROs by cycling over $N_1$ spatial settings with a Type-1 RA procedure. In step 730, the UE transmits a PRACH preamble in $N_2$ ROs of a set of ROs by cycling over $N_2$ spatial settings with a Type-2 RA procedure. In step 740, the UE receives a RAR, wherein the RAR indicates a RO index corresponding to a detected PRACH preamble.

Alternatively (regarding step 740), the UE can receive more than one RAR. For example, the UE receives one RAR for each transmitted 2-step or 4-step PRACH preamble. In another example, the UE receives one RAR for the 2-step PRACH preambles transmitted in corresponding ROs and one RAR for the 4-step PRACH preambles transmitted in corresponding ROs, wherein ROs used for 2-step and 4-step PRACH transmissions are selected by the UE among ROs in one set of ROs.

Although FIG. 7 illustrate the method 700 various changes may be made to FIG. 7. For example, while the method 700 of FIG. 7 is shown as a series of steps, various steps could overlap, occur in parallel, occur in a different order, or occur multiple times. In another example, steps may be omitted or replaced by other steps. For example, steps of the method 700 can be executed in a different order.

Additionally, embodiments of the present disclosure describe configuring PRACH preambles and RO. The following examples and embodiments, such as those of FIG. 8, describe configuring PRACH preambles and RO.

Figure 8:
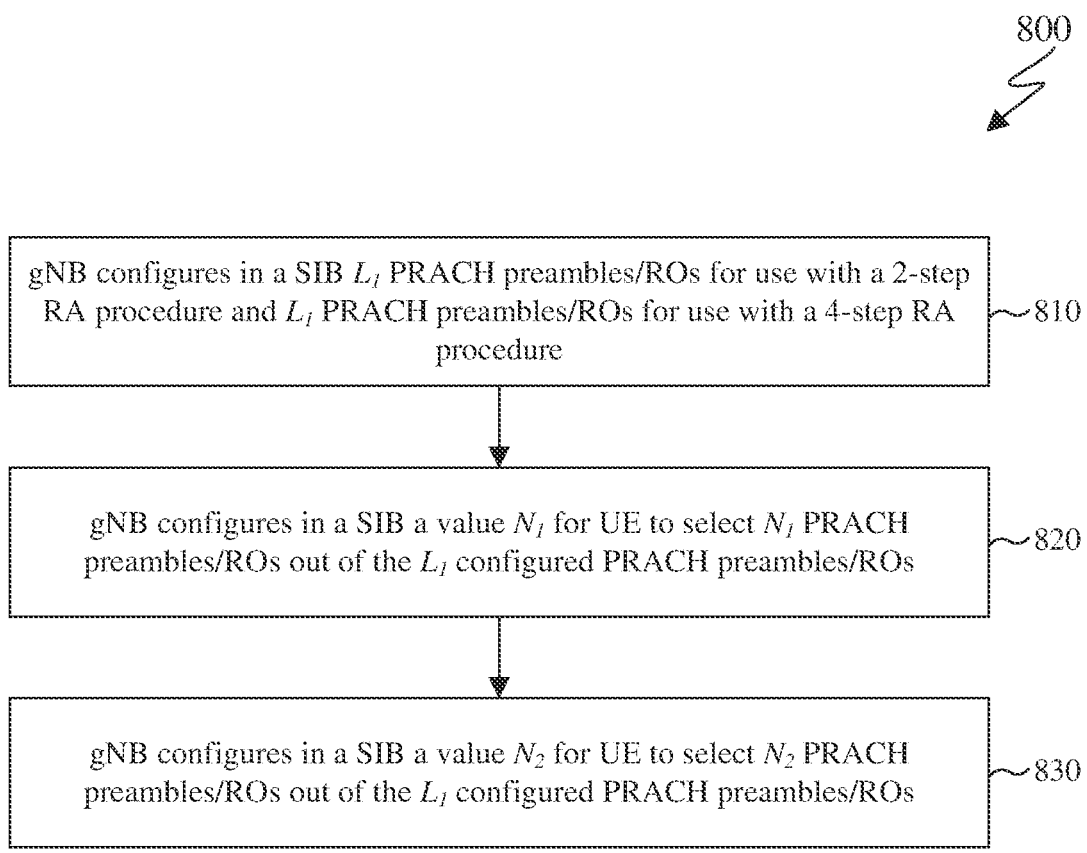
FIG. 8 illustrates an example method for a BS to configure a UE to determine PRACH preambles and corresponding ROs for transmission with different spatial settings based on a 2-step RA procedure and on a 4-step RA procedure according to embodiments of present disclosure.

FIG. 8 illustrates an example method 800 for a gNB to configure a UE to determine PRACH preambles and corresponding ROs for transmission with different spatial settings based on a 2-step RA procedure and on a 4-step RA procedure according to embodiments of present disclosure. The steps of the method 800 can be performed by any of the BSs 101-103 of FIG. 1, such as the BS 102 of FIG. 2 and a complementary procedure may be performed by a UE, such as UE 116. The method 800 of FIG. 8 is for illustration only and other embodiments can be used without departing from the scope of the present disclosure.

A gNB (such as the BS 102) can configure in a SIB sets of PRACH preambles. Here, each set of PRACH preambles includes N PRACH preambles and each PRACH preamble can be part of only one set, wherein each set includes N ROs and each RO can be part of only one set, and a mapping for pairs of a PRACH preamble set and a RO set. When a gNB configures more than one type of RA procedure, the above configurations are done for each configured type of RA procedure.

For example, when the UE transmits 4 PRACH preambles with 4 different spatial settings, and uses the 2-step RA procedure for transmitting with a first spatial setting, and the 4-step RA procedure for transmitting with a second, a third and a fourth spatial settings, the gNB can configure in a SIB sets of PRACH preambles wherein each set includes $L_1$ PRACH preambles and corresponding ROs for use with a 2-step RA procedure or includes $L_2$ PRACH preambles and corresponding ROs for use with a 4-step RA procedure. The UE selects $N_1$ PRACH preambles and corresponding ROs out of the $L_1$ configured PRACH preambles for transmission with a 2-step RA procedure and selects $N_2$ PRACH preambles and corresponding ROs out of the $L_2$ configured PRACH preambles for transmission with a 4-step RA procedure. The UE then transmits the $N_1+N_2$ PRACH preambles cycling over the N spatial settings. In the above example $N_1=1$, $N_2=3$, $N=4$. It is also possible that the gNB configures sets of $N_1$ PRACH preambles for use with a 2-step RA procedure and sets of $N_2$ PRACH preambles for use with a 4-step RA procedure, and uses them for PRACH transmissions.

As shown in FIG. 8, a gNB (such as BS 102) configures in a SIB $L_1$ PRACH preambles/ROs for use with a 2-step RA procedure and $L_2$ PRACH preambles/ROs for use with a 4-step RA procedure (step 810). In step 820, the gNB configures in a SIB a value $N_1$ for UE to select $N_1$ PRACH preambles/ROs out of the $L_1$ configured PRACH preambles/ROs. In step 830, the gNB configures in a SIB a value $N_2$ for UE to select $N_2$ PRACH preambles/ROs out of the $L_2$ configured PRACH preambles/ROs.

Although FIG. 8 illustrate the method 800 various changes may be made to FIG. 8. For example, while the method 800 of FIG. 8 is shown as a series of steps, various steps could overlap, occur in parallel, occur in a different order, or occur multiple times. In another example, steps may be omitted or replaced by other steps. For example, steps of the method 800 can be executed in a different order.

Embodiments of the present disclosure also describe determining spatial settings based on UE measurements. The following examples and embodiments, such as those of FIG. 9, describe determining spatial settings based on UE measurements.

Figure 9:
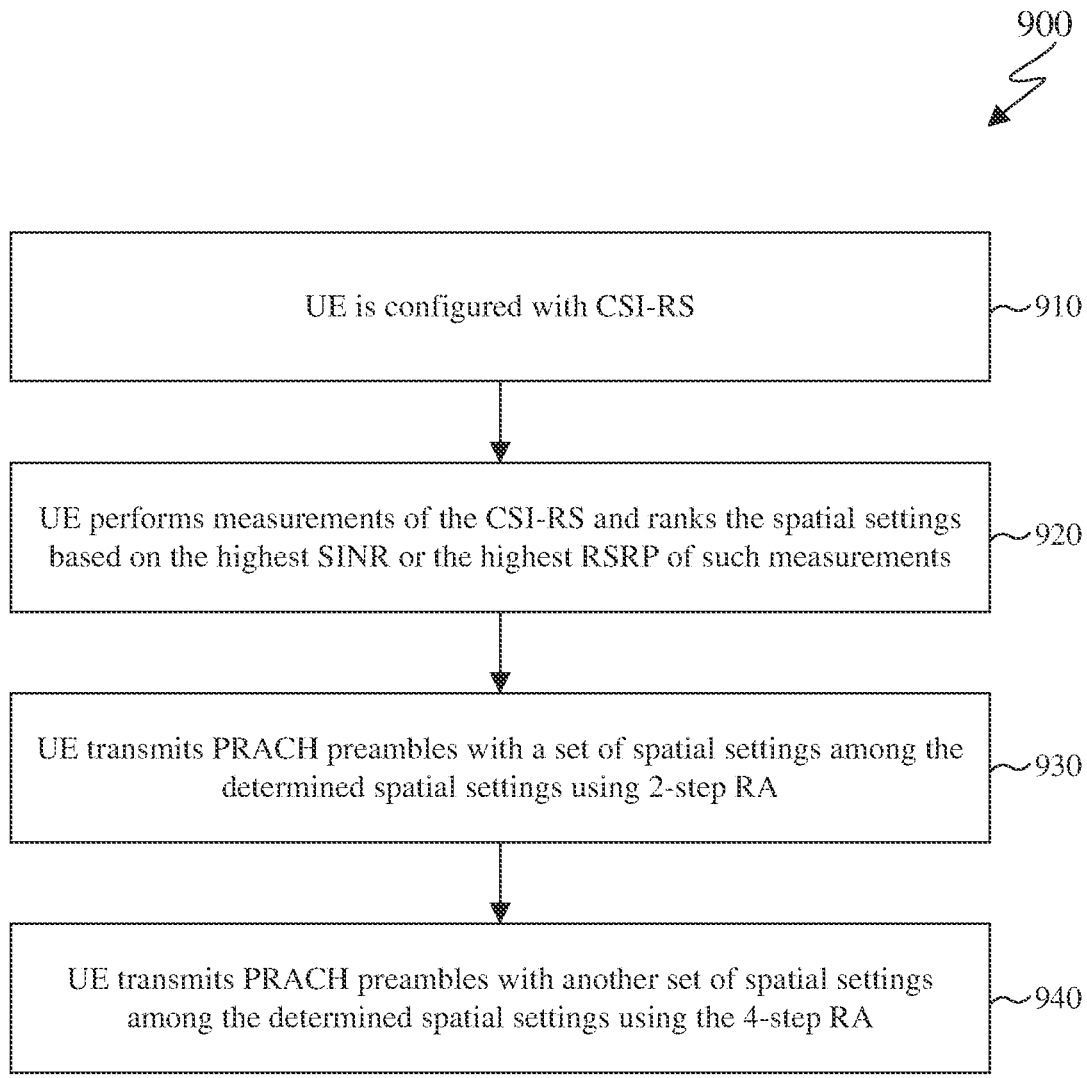
FIG. 9 illustrates an example method for a UE to determine the spatial settings used for PRACH transmissions with either a 2-step or a 4-step RA procedure according to embodiments of present disclosure.

FIG. 9 illustrates an example method 900 for a UE to determine the spatial settings used for PRACH transmissions with either a 2-step or a 4-step RA procedure according to embodiments of present disclosure. The steps of the method 900 can be performed by any of the UEs 111-116 of FIG. 1, such as the UE 116 of FIG. 3. The method 900 of FIG. 9 is for illustration only and other embodiments can be used without departing from the scope of the present disclosure.

In certain embodiments, a UE (such as the UE 116) is configured a 2-step and a 4-step RACH. For example, the UE transmits four PRACH preambles with four different spatial settings, and uses the 2-step RA procedure for transmitting with two spatial settings, and the 4-step RA procedure for transmitting with other two spatial settings. The UE can determine a spatial setting to use with either the 2-step or 4-step RA procedure based on measurements of a DL channel quality. A gNB can configure and transmit CSI-RS and enable the UE to perform measurements to determine the spatial settings for PRACH transmissions. The UE can perform measurements of the CSI-RS and determine two spatial settings that give the highest signal-to-interference and noise ratio (SINR), or the highest RSRP, of such measurements. Then the UE transmits PRACH preambles with the two spatial settings with the highest rankings with the 2-step RA procedure and the other two spatial settings are used with the 4-step RA procedure. The UE can also use the spatial settings with the highest rankings for the 4-step RA procedure and the lowest for the 2-step RA procedure. It is also possible that the UE determines one spatial setting for PRACH transmission for the 2-step RA procedure and one spatial setting for PRACH transmission for the 4-step RACH procedure. Alternatively, the UE can perform measurements based on a SSB configuration to determine the spatial settings for PRACH transmissions.

As shown in FIG. 9, a UE is configured with CSI-RS (step 910). In step 920, the UE performs measurements of the CSI-RS and ranks the spatial settings based on the highest SINR or the highest RSRP of such measurements. In step 930, the UE transmits PRACH preambles with a set of spatial settings among the determined spatial settings using 2-step RA. In step 940, the UE transmits PRACH preambles with another set of spatial settings among the determined spatial settings using the 4-step RA. Alternatively, the UE can perform measurements based on an SSB configuration to determine the spatial settings Although FIG. 9 illustrate the method 900 various changes may be made to FIG. 9. For example, while the method 900 of FIG. 9 is shown as a series of steps, various steps could overlap, occur in parallel, occur in a different order, or occur multiple times. In another example, steps may be omitted or replaced by other steps. For example, steps of the method 900 can be executed in a different order.

Embodiments of the present disclosure also describe determining a RO index indicated by a RAR. The following examples and embodiments, such as those of FIGS. 10 and 11, describe determining a RO index indicated by a RAR.

Figure 10:
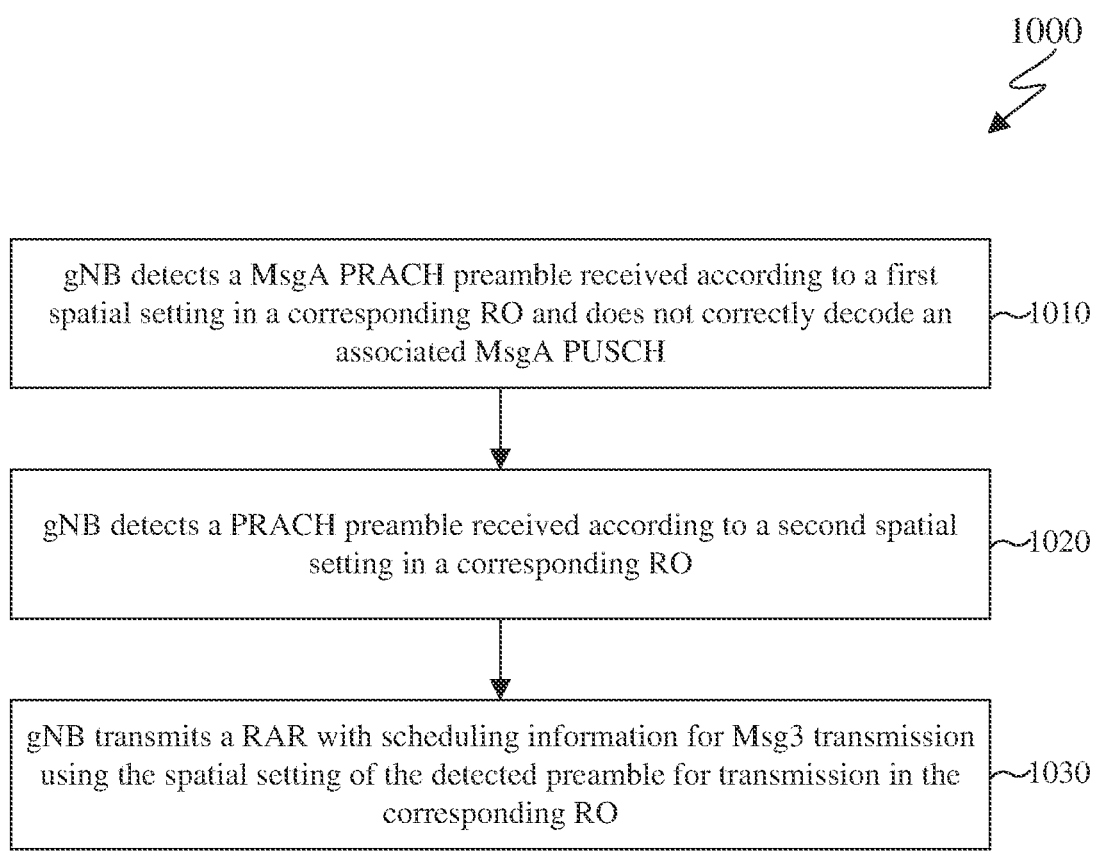
FIG. 10 illustrates an example method for a gNB to transmit a random access response (RAR) when the gNB detects a MsgA PRACH preamble, does not correctly decode a MsgA PUSCH, and also detects a Msg1 PRACH preamble according to embodiments of present disclosure.
Figure 11:
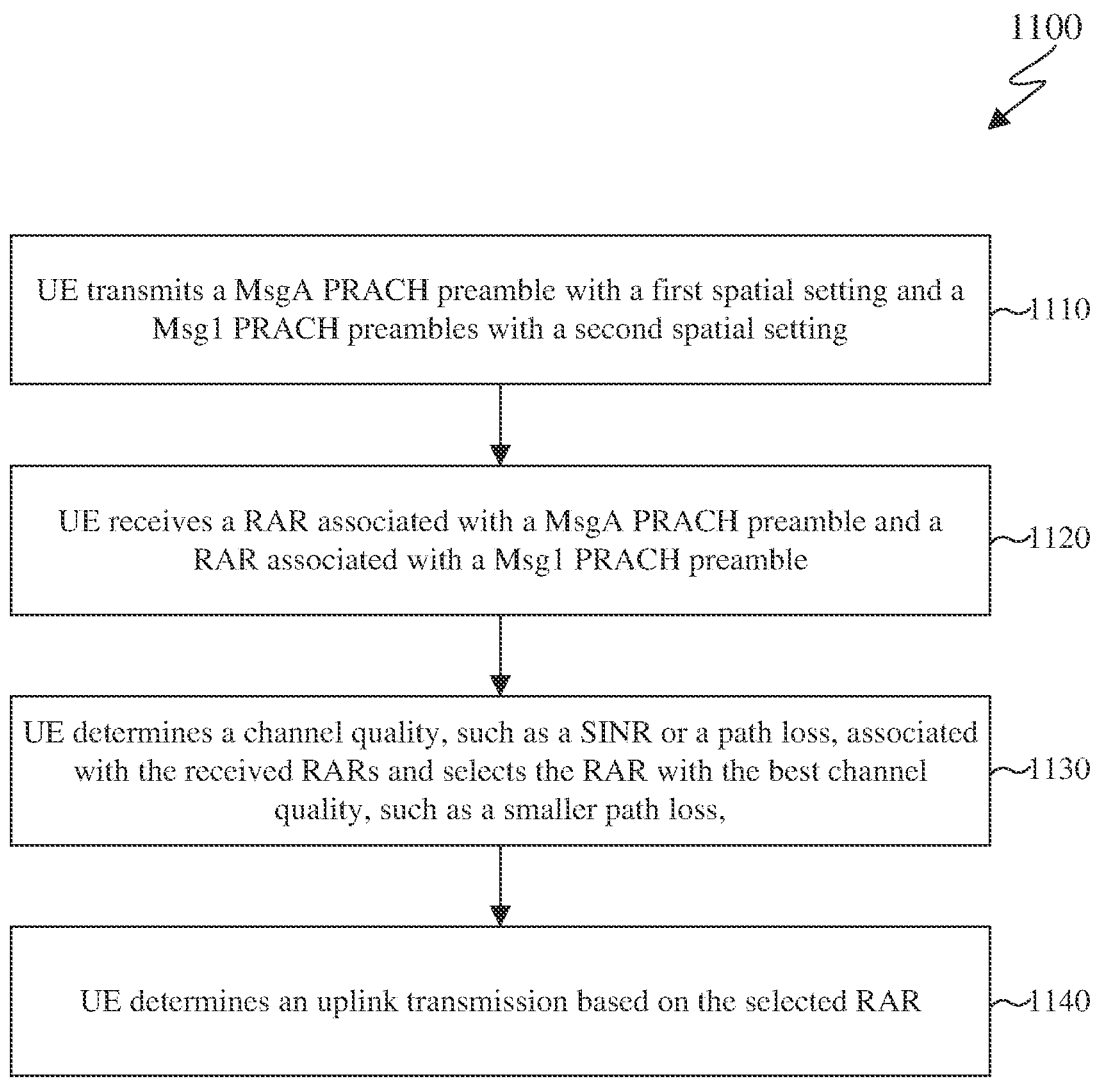
FIG. 11 illustrates an example method for a UE to receive multiple RARs after transmitting multiple PRACH preambles according to embodiments of present disclosure.

FIG. 10 illustrates an example method 1000 for a gNB to transmit a RAR when the gNB detects a MsgA PRACH preamble, does not correctly decode a MsgA PUSCH, and also detects a Msg1 PRACH preamble according to embodiments of present disclosure. FIG. 11 illustrates an example method 1100 for a UE to receive multiple RARs after transmitting multiple PRACH preambles according to embodiments of present disclosure. The steps of the method 1000 and the method 1100 can be performed by any of the UEs 111-116 of FIG. 1, such as the UE 116 of FIG. 3, or any of the BSs 101-103 of FIG. 1, such as the BS 102 of FIG. 2. The method 1000 of FIG. 10 and the method 1100 of FIG. 11 are for illustration only and other embodiments can be used without departing from the scope of the present disclosure.

When a UE transmits multiple PRACH preambles in multiple ROs cycling over different spatial settings, the gNB may receive multiple PRACH preambles in multiple ROs. Here the PRACH preambles may have been transmitted using a 2-step RA and/or a 4-step RA. The gNB can select an RO among the multiple ROs to indicate a corresponding PRACH preamble detection in the RAR. As in the above example where a UE transmits 4 PRACH preambles with 4 different spatial settings, and uses the 2-step RA procedure for transmitting with a first spatial setting, and the 4-step RA procedure for transmitting with a second, a third and a fourth spatial settings, upon detection of the MsgA PRACH preamble transmitted with a first spatial setting and successful reception of the MsgA PUSCH, the gNB transmits a RAR that includes an indication of the successful reception of the MsgA using the spatial setting used by the detected PRACH preamble for transmission in the corresponding RO. When the gNB detects the MsgA PRACH preambles but fails to correctly decode the MsgA PUSCH, the gNB can transmit a fallback RAR to the UE with the random access preamble ID and an uplink grant for the MsgA PUSCH retransmission. Alternatively, if at least one of the PRACH preamble the UE transmits with the 4-step RA procedure is detected by the gNB, for example the PRACH preamble sent with a second spatial setting, the gNB transmits a RAR that includes scheduling information (UL grant) for Msg3 PUSCH transmission using the second spatial setting used by the detected PRACH preamble for transmission in the corresponding RO. If the gNB receives multiple PRACH preambles transmitted using a 4-step RA procedure, the gNB selects one of the received PRACH preambles and transmits a RAR that includes scheduling information for Msg3 PUSCH transmission using the spatial setting of the selected PRACH preamble for transmission in the corresponding RO.

As shown in FIG. 10, a gNB (such as the BS 102) detects a MsgA PRACH preamble received according to a first spatial setting in a corresponding RO and does not correctly decode an associated MsgA PUSCH (step 1010). In step 1020, the gNB also detects a PRACH preamble received according to a second spatial setting in a corresponding RO. In step 1030, the gNB transmits a RAR with scheduling information for a Msg3 PUSCH transmission using the spatial setting of the detected PRACH preamble for transmission in the corresponding RO. Alternatively in step 1030, the gNB can transmit a RAR to schedule a retransmission of MsgA PUSCH.

In certain embodiments, it is also possible that when a gNB detects a MsgA PRACH preamble received according to a first spatial setting in a corresponding RO, the gNB may not correctly decode a corresponding MsgA PUSCH, and detect a Msg1 PRACH preamble received according to a second spatial setting in a corresponding RO. Here, the gNB transmits a RAR corresponding to the received PRACH preamble that is received with a better channel quality such as a larger SINR or reception power. An alternative to step 1030 of FIG. 10, the gNB transmits a RAR in response to either the MsgA PRACH preamble or to the Msg1 PRACH preamble based on the channel quality associated with the reception of a PRACH preamble, wherein the channel quality can be either estimated by the gNB or an indication of the channel quality is reported by the UE.

In certain embodiments, it is also possible that when a gNB detects a MsgA PRACH preamble received according to a first spatial setting in a corresponding RO, the gNB does not correctly decode a corresponding MsgA PUSCH, and detects a PRACH preamble transmitted with the 4-step RA procedure and received according to a second spatial setting in a corresponding RO. In this example, the gNB transmits a RAR corresponding to the detected MsgA PRACH preamble transmitted with a first spatial setting in a corresponding RO that indicates an uplink grant for the MsgA PUSCH retransmission and a RAR corresponding to the detected PRACH preamble transmitted with a second spatial setting in a corresponding RO. When the UE receives multiple RARs, the UE can determine a channel quality for RAR selection, where in the channel quality is associated with the estimated path loss of a RAR, and/or is associated with the transmit power of a Msg3 transmission corresponding to a received RAR, and/or is associated with the MCS of a Msg3 transmission corresponding to a received RAR.

As shown in FIG. 11, a UE (such as the UE 116) transmits a MsgA PRACH preamble with a first spatial setting and a Msg1 PRACH preambles with a second spatial setting (step 1110). In step 1120, the UE receives a RAR associated with a MsgA PRACH preamble and a RAR associated with a Msg1 PRACH preamble. In step 1130, the UE determines a channel quality, such as a SINR or a path loss, associated with the received RARs and selects the RAR with the best channel quality, such as a smaller path loss. In step 1140, the UE determines an uplink transmission based on the selected RAR.

A similar procedure to the one described in FIG. 11 applies when a UE transmits multiple MsgA PRACH preamble and multiple Msg1 PRACH preambles with different spatial settings, and the UE receives multiple RARs associated with MsgA PRACH preambles and/or Msg1 PRACH preambles.

Although FIGS. 10 and 11 illustrate the methods 1000 and 1100 various changes may be made to FIGS. 10 and 11. For example, while the method 1000 of FIG. 10 and the method 1100 of FIG. 11 are shown as a series of steps, various steps could overlap, occur in parallel, occur in a different order, or occur multiple times. In another example, steps may be omitted or replaced by other steps. For example, steps of the method 1000 can be executed in a different order.

Embodiments of the present disclosure also describe determining a RAR based on information provided by a MsgA PUSCH. The following examples and embodiments, such as those of FIG. 12, describe determining a RAR based on information provided by a MsgA PUSCH.

Figure 12:
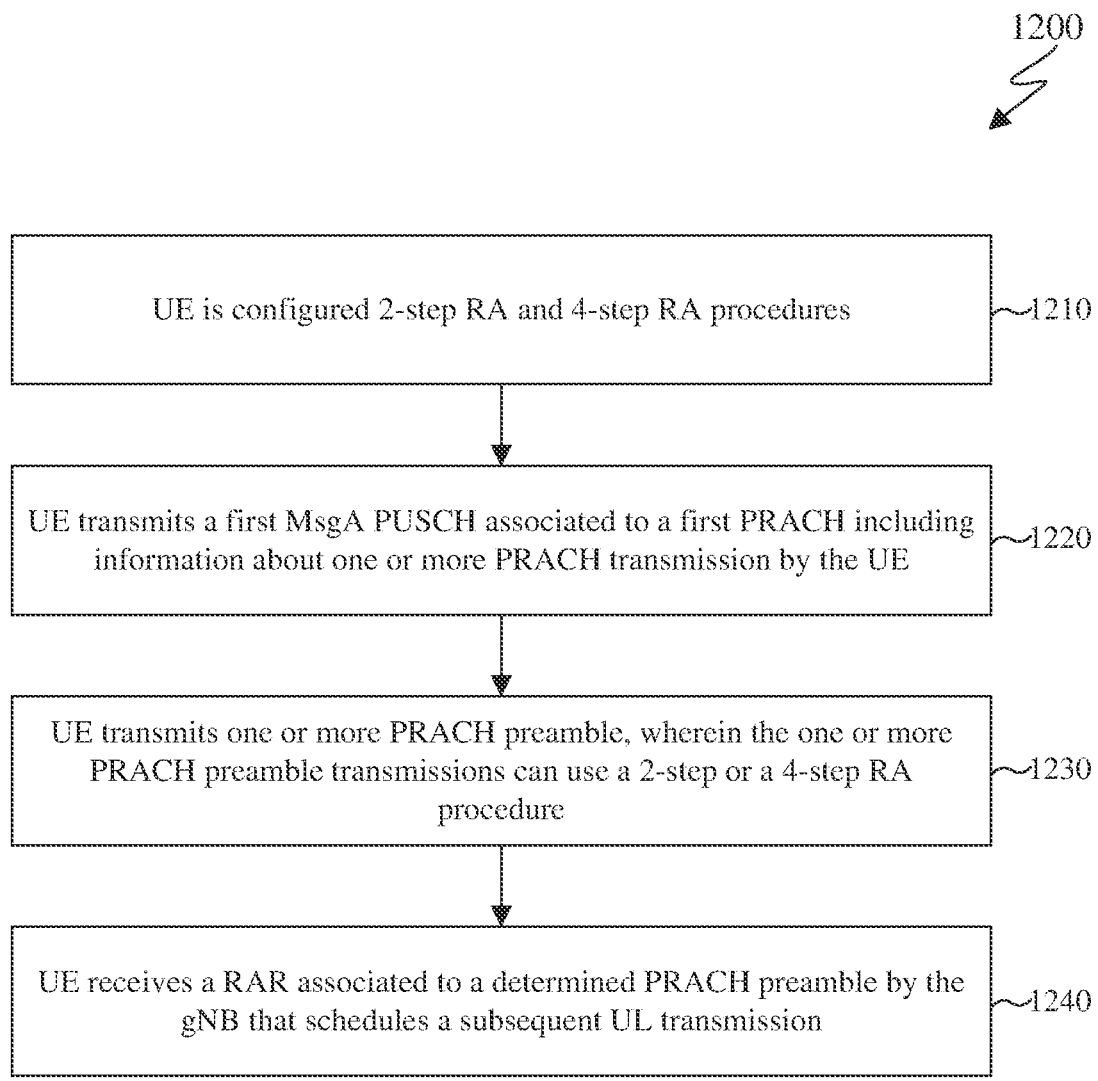
FIG. 12 illustrates an example method for a UE to transmit a MsgA PUSCH that includes information about one or more PRACH preamble transmission by a same, wherein the one or more PRACH preamble transmission can use a 2-step or a 4-step RA procedure according to embodiments of present disclosure.

FIG. 12 illustrates an example method 1200 for a UE to transmit a MsgA PUSCH that includes information about one or more PRACH preamble transmission by a same, wherein the one or more PRACH preamble transmission can use a 2-step or a 4-step RA procedure according to embodiments of present disclosure. The steps of the method 1200 can be performed by any of the UEs 111-116 of FIG. 1, such as the UE 116 of FIG. 3 and a complementary procedure may be performed by a BS, such as BS 102. The method 1200 of FIG. 12 is for illustration only and other embodiments can be used without departing from the scope of the present disclosure.

In certain embodiments, a UE can include in a first MsgA PUSCH transmitted in a PO associated to a PRACH preamble transmitted in a corresponding first RO information about the transmission of additional PRACH preambles that are transmitted by a same UE. Here the additional PRACH preamble transmissions can be PRACH MsgA or PRACH Msg1. Upon reception of the first MsgA PUSCH and of the additional PRACH preambles and MsgA PUSCH if applicable, the gNB can transmit one RAR to schedule a subsequent uplink transmission. A gNB can determine the PRACH preamble that is associated to the transmitted RAR based on the information provided by a first MsgA PUSCH and the quality of reception of the PRACH preambles such as a received power.

As shown in FIG. 12, a UE is configured 2-step RA and 4-step RA procedures (step 1210). In step 1220, the UE transmits a first MsgA PUSCH associated to a first PRACH including information about one or more PRACH transmission by the UE. in step 1230, the UE transmits one or more PRACH preamble, wherein the one or more PRACH preamble transmissions can use a 2-step or a 4-step RA procedure. In step 1240, the UE receives a RAR associated to a determined PRACH preamble by the gNB that schedules a subsequent UL transmission.

Although FIG. 12 illustrate the method 1200 various changes may be made to FIG. 12. For example, while the method 1200 of FIG. 12 is shown as a series of steps, various steps could overlap, occur in parallel, occur in a different order, or occur multiple times. In another example, steps may be omitted or replaced by other steps. For example, steps of the method 1200 can be executed in a different order.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) comprising:
a transceiver configured to receive:
a system information block (SIB), wherein the SIB indicates:
a set of channel state information reference signals (CSI-RS) resources for CSI-RSs,
a set of random access occasions (ROs), and
a mapping between the set of ROs and the set of CSI-RS resources, and
at least two of the CSI-RSs on respective CSI-RS resources that include a first CSI-RS resource and a second CSI-RS resource; and
a processor operably coupled to the transceiver, the processor configured to determine:
a first RO and a second RO from the set of ROs for transmission of a first physical random access channel (PRACH) and for transmission of a second PRACH, based on reference signal received power (RSRP) values for the at least two CSI-RSs, respectively, wherein the first CSI-RS resource is associated with a largest of the RSRP values, and the second CSI-RS resource is associated with a second largest of the RSRP values,
a first spatial setting for the first PRACH transmission based on the first CSI-RS resource from the set of CSI-RS resources that is mapped to the first RO, and
a second spatial setting for the second PRACH transmission based on the second CSI-RS resource from the set of CSI-RS resources that is mapped to the second RO,
wherein the transceiver is further configured to transmit the first PRACH in the first RO using the first spatial setting, and the second PRACH in the second RO using the second spatial setting.

2. The UE of claim 1, wherein a preamble used to transmit the first PRACH is independent of the at least two CSI-RSs.

3. The UE of claim 1, wherein:
the transceiver is further configured to receive information for partitions of PRACH preambles associated with configurations;
the processor is further configured to determine a PRACH preamble from the PRACH preambles; and; and
the transceiver is further configured to transmit the first PRACH and the second PRACH using the PRACH preamble.

4. The UE of claim 3, wherein:
the first PRACH transmission is associated with a first random access (RA) procedure that includes two steps, and
the second PRACH transmission is associated with a second RA procedure that includes four steps.

5. The UE of claim 1, wherein:
the transceiver is further configured to transmit a physical uplink shared channel (PUSCH) after the first PRACH transmission, and
the PUSCH includes an indication for the first CSI-RS resource.

6. The UE of claim 1, wherein the transceiver is further configured to receive a random access response (RAR) message with a same spatial setting as for the first CSI-RS resource.

7. The UE of claim 6, wherein:
the transceiver is further configured to:
receive a first CSI-RS on the first CSI-RS resource, and
transmit a physical uplink shared channel (PUSCH); and
the processor is further configured to determine:
a path loss based on the first CSI-RS, and
a power for the PUSCH transmission based on the path loss, wherein:
the PUSCH transmission is scheduled by the RAR, and
a spatial setting for the PUSCH transmission is the first spatial setting.

8. A base station (BS) comprising:
a transceiver configured to transmit
a system information block (SIB), wherein the SIB indicates:
a set of channel state information reference signals (CSI-RS) resources for CSI-RSs,
a set of random access occasions (ROs), and
a mapping between the set of ROs and the set of CSI-RS resources, and
at least two of the CSI-RSs on respective CSI-RS resources that include a first CSI-RS resource and a second CSI-RS resource; and
a processor operably coupled to the transceiver, the processor configured to determine:
a first RO and a second RO from the set of ROs for reception of a first physical random access channel (PRACH) reception and reception of a second PRACH, based on reference signal received power (RSRP) values for the at least two-CSI-RSs, respectively, wherein the first CSI-RS resource is associated with a largest of the RSRP values, and the second CSI-RS resource is associated with a second largest of the RSRP values,
a first spatial setting for the first PRACH reception based on the first CSI-RS resource from the set of CSI-RS resources that is mapped to the first RO, and
a second spatial setting for the second PRACH reception based on the second CSI-RS resource from the set of CSI-RS resources that is mapped to the second RO,
wherein the transceiver is further configured to receive the first PRACH in the first RO using the first spatial setting, and the second PRACH in the second RO using the second spatial setting.

9. The BS of claim 8, wherein:
the transceiver is further configured to transmit information for partitions of PRACH preambles associated with configurations;
the processor is further configured to determine a PRACH preamble from the PRACH preambles; and
the transceiver is further configured to receive the first PRACH and the second PRACH using the PRACH preamble.

10. The BS of claim 9, wherein:
the first PRACH reception is associated with a first random access (RA) procedure that includes two steps, and
the second PRACH reception is associated with a second RA procedure that includes four steps.

11. The BS of claim 8, wherein:
the transceiver is further configured to receive a physical uplink shared channel (PUSCH) after the first PRACH reception, and
the PUSCH includes an indication for the first CSI-RS resource.

12. The BS of claim 8, wherein the transceiver is further configured to transmit a random access response (RAR) message with a same spatial setting as for the first CSI-RS resource.

13. The BS of claim 12, wherein:
the transceiver is further configured to:
  transmit a first CSI-RS on the first CSI-RS resource, and
  receive a physical uplink shared channel (PUSCH);
the PUSCH reception is scheduled by the RAR; and
a spatial setting for the PUSCH reception is the first spatial setting.

14. A method comprising:
receiving
  a system information block (SIB), wherein the SIB indicates:
    a set of channel state information reference signals (CSI-RS) resources for CSI-RSs,
    a set of random access occasions (ROs), and
    a mapping between the set of ROs and the set of CSI-RS resources, and
  at least two of the CSI-RSs on respective CSI-RS resources that include a first CSI-RS resource and a second CSI-RS resource;
determining a first RO and a second RO from the set of ROs for transmission of a first physical random access channel (PRACH) and for transmission of a second PRACH, based on reference signal received power (RSRP) values for the at least two CSI-RSs, respectively, wherein the first CSI-RS resource is associated with the RSRP values, and the second CSI-RS resource is associated with a second largest of the RSRP values;
determining a first spatial setting for the first PRACH transmission based on the first CSI-RS resource from the set of CSI-RS resources that is mapped to the first RO;
determining a second spatial setting for the second PRACH transmission based on the second CSI-RS resource from the set of CSI-RS resources that is mapped to the second RO; and
transmitting the first PRACH in the first RO using the first spatial setting, and the second PRACH in the second RO using the second spatial setting.

15. The method of claim 14, wherein a preamble used to transmit the first PRACH is independent of the at least two CSI-RSs.

16. The method of claim 14, further comprising:
receiving information for partitions of PRACH preambles associated with configurations;
determining a PRACH preamble from the PRACH preambles; and
transmitting the first PRACH and the second PRACH using the PRACH preamble.

17. The method of claim 16, wherein:
the first PRACH transmission is associated with a first random access (RA) procedure that includes two steps, and
the second PRACH transmission is associated with a second RA procedure that includes four steps.

18. The method of claim 14, further comprising transmitting a physical uplink shared channel (PUSCH) after the first PRACH transmission, wherein the PUSCH includes an indication for the first CSI-RS resource.

19. The method of claim 14, further comprising receiving a random access response (RAR) message with a same spatial setting as for the first CSI-RS resource.

20. The method of claim 19, further comprising:
receiving a first CSI-RS on the first CSI-RS resource;
determining:
  a path loss based on the first CSI-RS, and
  a power for a physical uplink shared channel (PUSCH) transmission based on the path loss, wherein:
    the PUSCH transmission is scheduled by the RAR, and
    a spatial setting for the PUSCH transmission is the first spatial setting; and
transmitting the PUSCH.

* * * * *